(12) United States Patent
Zhang et al.

(10) Patent No.: US 12,614,114 B2
(45) Date of Patent: Apr. 28, 2026

(54) INTERNET-OF-THINGS-ORIENTED MACHINE LEARNING CONTAINER IMAGE DOWNLOAD METHOD AND SYSTEM

(71) Applicant: NANJING UNIVERSITY OF POSTS AND TELECOMMUNICATIONS, Nanjing (CN)

(72) Inventors: Dengyin Zhang, Nanjing (CN); Zijie Liu, Nanjing (CN); Haoran Chen, Nanjing (CN); Yi Cheng, Nanjing (CN); Can Chen, Nanjing (CN); Mengda Zhu, Nanjing (CN); Hui Xu, Nanjing (CN)

( * ) Notice: Subject to any disclaimer, the term of this patent is extended or adjusted under 35 U.S.C. 154(b) by 695 days.

(21) Appl. No.: 18/152,020

(22) Filed: Jan. 9, 2023

(65) Prior Publication Data

US 2024/0127111 A1 Apr. 18, 2024

Related U.S. Application Data

(63) Continuation of application No. PCT/CN2022/135368, filed on Nov. 30, 2022.

(30) Foreign Application Priority Data

Oct. 13, 2022 (CN) .......................... 202211250853.1

(51) Int. Cl.
*G06N 20/00* (2019.01)

(52) U.S. Cl.
CPC .................................... *G06N 20/00* (2019.01)

(58) Field of Classification Search
CPC ............................. G06F 9/45558; G06N 20/00
See application file for complete search history.

(56) References Cited

U.S. PATENT DOCUMENTS

| | | | | | |
|---|---|---|---|---|---|
| 2017/0344910 | A1* | 11/2017 | Wu | .......................... | G06N 3/09 |
| 2019/0156244 | A1* | 5/2019 | Faulhaber, Jr. | ....... | G06F 9/5072 |
| 2020/0234195 | A1* | 7/2020 | Deshpande | ........... | G06N 20/00 |

FOREIGN PATENT DOCUMENTS

| | | |
|---|---|---|
| CN | 110198364 A | 9/2019 |
| CN | 110300192 A | 10/2019 |

(Continued)

OTHER PUBLICATIONS

WO2021033110A1 Translation (Year: 2021).*

*Primary Examiner* — Schyler S Sanks

(57) ABSTRACT

The present disclosure discloses an Internet-of-Things-oriented machine learning container image download system and a method. The Internet-of-Things-oriented machine learning container image download system includes a master node and a plurality of computing nodes; the master node is configured to store and convert a machine learning model, and build a machine learning container image from the format-converted machine learning model; and issue an image download instruction to each of the computing nodes after image information of the machine learning container image is completely built; and each of the computing nodes is configured to receive the image download instruction, download the machine learning container image, and start a machine learning container; and receive data collected by Internet-of-Things devices, and return a data processing result to the Internet-of-Things devices. According to the present disclosure, the image distribution efficiency of the machine learning container in an Internet-of-Things-oriented scenario can be increased.

8 Claims, 11 Drawing Sheets

(56) References Cited

FOREIGN PATENT DOCUMENTS

| | | | |
|---|---|---|---|
| CN | 112953727 A | 6/2021 | |
| WO | WO-2021033110 A1 * | 2/2021 | ....... G06F 9/455533 |

* cited by examiner

1: Determining whether an error exists during initialization
2: Determining whether an error exists during analysis
3: Determining whether an error exists during format conversion 1: Determining whether an error exists during initialization
2: Determining whether a file of an image exists locally 1: Determining whether an error exists during starting
2: Determining whether an error exists during connection
3: Determining whether all the computing nodes join the cluster 1: Determining whether an error exists during starting
2: Determining whether an error exists during connection
3: Determining whether the request is passed 1: Determining whether a model satisfying an inquiry condition exists 1: Determining whether an error exists during reading 1: Determining whether the list of the computing nodes is null
2: Determining whether the file of the image exists locally

INTERNET-OF-THINGS-ORIENTED MACHINE LEARNING CONTAINER IMAGE DOWNLOAD METHOD AND SYSTEM

CROSS-REFERENCE TO RELATED APPLICATIONS

The application claims priority to Chinese patent application No. 202211250853.1, filed on Oct. 13, 2022, the entire contents of which are incorporated herein by reference.

TECHNICAL FIELD

The present disclosure relates to an Internet-of-Things-oriented machine learning container image download method and system, and belongs to the technical field of computers.

BACKGROUND

With the advent of the era of Internet of Things, the number of Internet-of-Things devices is growing exponentially. When facing data processing requests from massive Internet-of-Things devices, a traditional centralized architecture for cloud computing will bear huge computing pressure, which easily causes a situation that data processing tasks to be executed cannot meet a requirement for real-time response. Therefore, it has become the current development trend to offload tasks from the cloud infrastructures to the edge and make full use of a container virtualization technology to achieve lightweight deployment of the tasks.

In today's intelligent era, machine learning algorithms are increasingly widely applied to the Internet-of-Things devices to achieve efficient data processing without human intervention. Owing to its lightweight feature, the container virtualization technology is more suitable for task deployment of resource-constrained Internet-of-Things devices. However, an existing machine learning container image distribution solution for an Internet-of-Things scenario is still unable to meet users' needs for the real-time response due to its lower distribution efficiency. The main causes for this problem are as follows: on one hand, the volume of data transmitted during container image distribution is larger; specifically, in an existing solution, a machine learning container consists of a machine learning model and a machine learning computing framework on which the machine learning model depends; however, the current mainstream machine learning computing framework takes up much more storage space than the machine learning model itself, resulting in large data volume to be transmitted during image distribution process. Therefore, Downloading the whole machine learning container image the download of a machine learning container image with a large size will delay the starting time of a container and affect the executing efficiency of a task; and on the other hand, there is a fierce competition for network bandwidth resources during container image distribution. In the existing solution, the Internet-of-Things devices are required to download the machine learning container image from a centralized container image repository. When a large number of Internet-of-Things devices initiate image download requests to the container image repository within a short period of time, these Internet-of-Things devices will compete for outlet bandwidth resources of the centralized container image repository, resulting in network congestion and delay the starting time of the container.

SUMMARY

The objective of the present disclosure is to overcome defects in the prior art and provide a method for Internet-of-Things-oriented machine learning containers to solve the problem of low image distribution efficiency of machine learning containers caused by large image volume and fierce network bandwidth competition in the current Internet-of-Things scenario.

In order to achieve the above-mentioned objective, the present disclosure is implemented by adopting the following technical solutions.

In a first aspect, the present disclosure provides an Internet-of-Things-oriented machine learning container image download system including a master node and a plurality of computing nodes;

the master node is configured to store and convert a machine learning model, and build a machine learning container image from the format-converted machine learning model; and issue an image download instruction to each of the computing nodes after image information of the machine learning container image is completely built; and each of the computing nodes is configured to receive the image download instruction, download the machine learning container image, and start a machine learning container; and receive data collected by Internet-of-Things devices, and return a data processing result to the Internet-of-Things devices.

Further, the machine learning model comprises a pre-training machine learning model in the field of computer vision and natural language processing.

Further, the master node comprises a control plane, a machine learning model repository, a machine learning model converter, a machine learning container image builder, a machine learning container image repository and a scheduler, the control plane is configured to read and analyze machine learning container deployment parameters set by a user, wherein the machine learning container deployment parameters comprise a type of the machine learning model, a corresponding machine learning computing framework on which the machine learning model depends, and a computing node parameter required for deploying the machine learning container;

the machine learning model repository is configured to store the machine learning model;

the machine learning model converter is configured to convert the machine learning model into a machine learning model in an ONNX format;

the machine learning container image builder is configured to build the machine learning container image according to the machine learning model converted into the ONNX format;

the machine learning container image repository is configured to store the machine learning container image with image information; and the scheduler is configured to receive the computing node parameter set from the control plane and the image information of the machine learning container image, and send the image download instruction to each of the computing nodes.

Further, each of the computing nodes comprises an image distribution agent, a container engine and a distributed storage module;

the image distribution agent is configured to receive the image download instruction, inform the container engine to download the machine learning container image, intercept a download request of the machine learning container image from the container engine, and access the distributed storage module in the computing node where the image distribution agent is located;

the container engine is configured to receive a notification from the image distribution agent and initiate the download request of the machine learning container image; and the distributed storage module is configured to store the downloaded machine learning container image, acquire a download source comprising the machine learning container image for the image distribution agent, and download the machine learning container image from the acquired download source, wherein all the distributed storage modules are interconnected with one another.

Further, the distributed storage module downloads the machine learning container image from the download source of the machine learning container image by adopting a Bitswap protocol.

Further, the completely built machine learning container image comprises running scripts for executing the machine learning model and its dependent libraries.

In a second aspect, the present disclosure provides an Internet-of-Things-oriented machine learning container image download method, and the method includes the following steps:

reading the machine learning container deployment parameters set by the user, analyzing the name of the machine learning model, and finding the required machine learning model from the machine learning model repository by the control plane; receiving the converted machine learning model in the ONNX format, and building the machine learning container image by the machine learning container image builder; and sending the stored information of the machine learning container image to the scheduler by the machine learning container image repository; and after the image distribution agent receives the image download instruction, acquiring an entire file of the machine learning container image from the download source of the machine learning container image by the corresponding distributed storage module; starting the corresponding machine learning container; receiving, by each of the computing nodes, the data collected by the Internet-of-Things devices, and performing data processing by the started machine learning container; and feeding a data processing result from the machine learning container back to the Internet-of-Things devices by the image distribution agent.

Further, a step that the machine learning model converter performs format conversion on a called machine learning model comprises:

receiving the machine learning model which depends on the given machine learning computing framework from the control plane by the machine learning model converter; and reading a template file converted into an ONNX format from the machine learning computing formwork;

if the file fails to read, writing the reading failure reason and the timestamp into a local log file by the machine learning model converter to facilitate error check performed by operating and maintaining personnel; and if the file is successfully read, converting the machine learning model and its dependent machine learning computing framework into the ONNX format by the machine learning model converter.

Further, a step that the container engine acquires the file of the machine learning container image comprises:

informing, by the image distribution agent, the container engine to initiate the download request of the machine learning container image to the machine learning container image repository; meanwhile, intercepting, by the image distribution agent, the download request initiated by the container engine, accessing the distributed storage module, and examining whether the file of the machine learning container image exists locally;

if the file exists, acquiring the file of the machine learning container image from the distributed storage module, and sending the file to the container engine by the image distribution agent;

if the file does not exist, inquiring, by the distributed storage module, whether the file of the required machine learning container image is comprised in the distributed storage modules of other computing nodes;

if the file is not found in a list of other computing nodes, initiating the download request of the machine learning container image to the machine learning container image repository of the master node, and sending the downloaded file of the machine learning container image to the container engine by the image distribution agent; and if the file is found in the distributed storage modules of other computing nodes, selecting the computing node of which the distributed storage module has the highest transmission rate as the download source of the machine learning container image: and sending the machine learning container image to the container engine.

Compared with the prior art, the pre sent disclosure achieves the beneficial effects:

the present disclosure provides an Internet-of-Things-oriented machine learning container image download system, a master node is configured to store and convert a machine learning model, and build a machine learning container image from the format-converted machine learning model; and issue an image download instruction to each of the computing nodes after image information of the machine learning container image is completely built; and each of the computing nodes is configured to receive the image download instruction, download the machine learning container image, and start a machine learning container; and receive data collected by an Internet-of-Things devices, and return a data processing result to the Internet-of-Things devices. During operations from the master node to the plurality of computing nodes, a situation in the prior art that the Internet-of-Things devices will compete for an outlet bandwidth resource of a centralized container image repository to result in network congestion and delay the starting time of a machine learning container can be effectively avoided.

The machine learning model is converted into the lightweight machine learning model in the ONNX format by the machine learning model converter, so that the volume of data transmitted during network transmission for the machine learning container image distribution.

The distributed storage module downloads the machine learning container image from the download source of the machine learning container image by adopting a Bitswap protocol, so that the competition for outlet bandwidth resources of a centralized container image repository can be effectively mitigated.

According to the method for the Internet-of-Things-oriented machine learning container image download system provided by the present disclosure, in the process that the container engine acquires the file of the machine learning container image, a list of the computing nodes including the file of the download source of the machine learning model image is acquired by the Bitswap protocol, the computing node with the highest transmission rate is selected therefrom to acquire the file of the machine learning image, so that the network bandwidth among the nodes are fully used to increase the overall executing efficiency of a task.

DETAILED DESCRIPTION OF THE EMBODIMENTS

Figure 1:
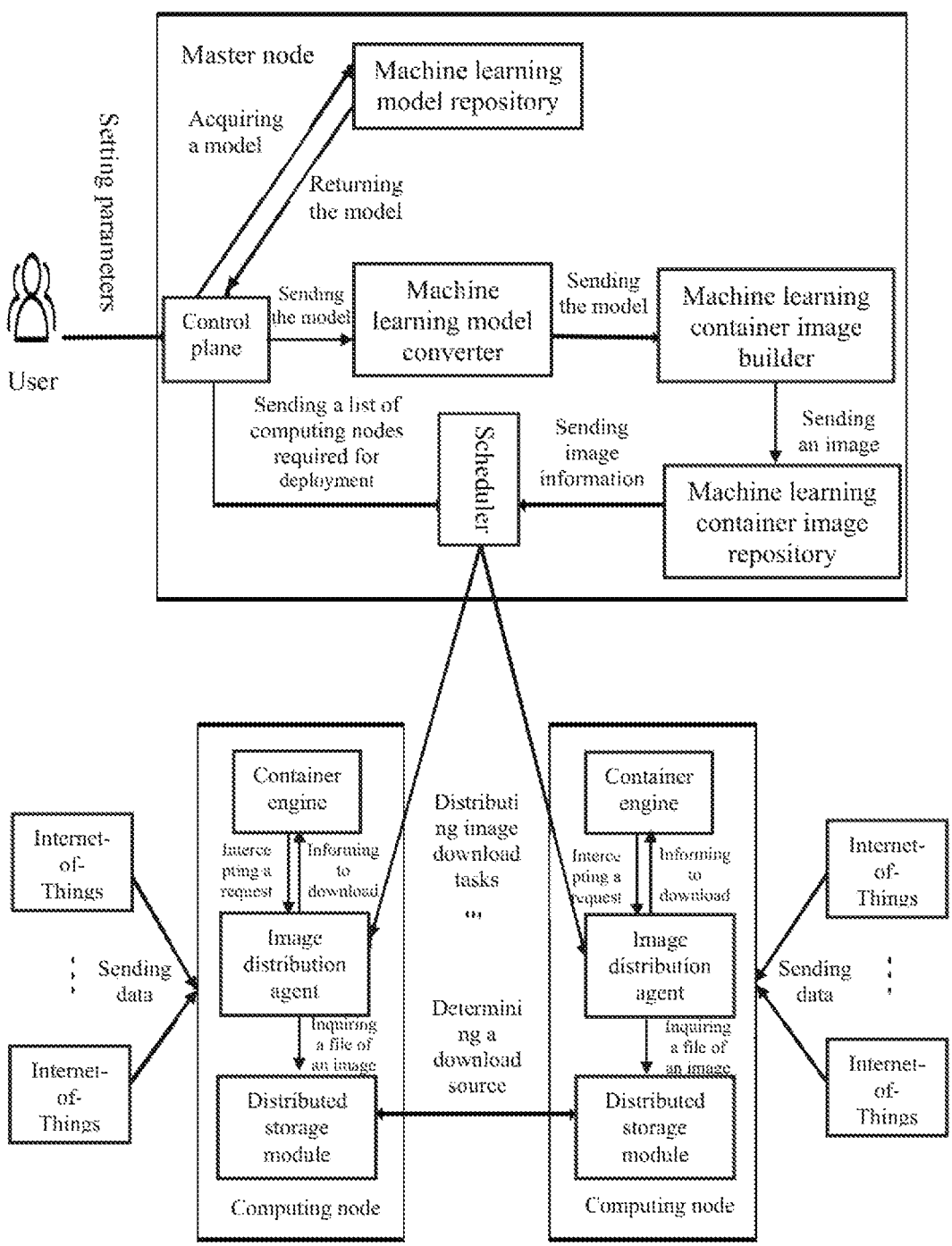
FIG. 1 is an architecture diagram of an Internet-of-Things-oriented machine learning container image download system provided by the present disclosure.

In recent years, many technical solutions for accelerating the download of a container image have been proposed in the industry and the academia. OpenKruise of Alibaba Cloud's native team provides users with an efficient image distribution task deployment way in a form of Kubernetes CRD. However, this solution does not fundamentally solve the problem that the image is downloaded slowly. Dragonfly of Alibaba Cloud's native team and SuperEdge of Tencent's native team use a P2P technology to make fall use of network bandwidth resources among nodes, thereby effectively mitigating the competition for the network bandwidth resources during image download of a centralized container image repository. Due to a larger size of a machine learning task image, this solution will still lead to too long time tier downloading files of images among the nodes, which cannot meet a requirement for real-time response in an Internet-of-Things scenario. In order to increase the distribution efficiency of container images, many researchers have proposed a lazy download way to speed up the starting of a container, in this way, the files of the images required during the starting of the container are only downloaded, and the container is started immediately after the download of the files of the required images is completed. However, if the files of the images required by the container are not downloaded locally during operation, this container still needs to be executed after the download of the files of the images is completed. It was found by many researchers that the container images often contain a large amount of duplicate data, so that an image redundancy removal technology is proposed to delete the duplicate data contained in container images, thereby reducing the sizes of the container images, in this solution, the image distribution efficiency is increased from the perspective of reducing the volume of the data transmitted during image download. However, in this solution, a redundancy removal operation needs to be performed on the container images in the centralized container image repository. Therefore, Internet-of-Things devices still need to download images from the centralized container image repository, and there is still the problem of competition for the network bandwidth resources during image download. Some other researchers achieve image sharing among nodes by establishing a distributed container image repository among the nodes. In this solution, network bandwidth resource among the nodes is fully used to effectively mitigate the competition for the network bandwidth resources during image download. Due to the larger size of the machine learning task image, this solution will still lead to too long time for downloading the files of the images from the distributed container image repository, which cannot meet a requirement for real-time response in an Internet-of-Things scenario.

Massive Internet-of-Things devices in the industry have increasing requirements for data processing performed by using a machine learning technology. However, the existing technical solutions for container image distribution either focus on reducing the volume of the data transmitted during container image distribution or mitigating the competition for the network bandwidth resources, but fail to fully consider factors that affect the image distribution efficiency so as to be unable to meet the requirement for real-time response in the Internet-of-Things scenario.

The present disclosure will be further described below in conjunction with the accompanying drawings. The following embodiments are only used to describe the technical solutions of the present disclosure more clearly, rather than to limit the protection scope of the present disclosure.

Embodiment 1

Figure 2:
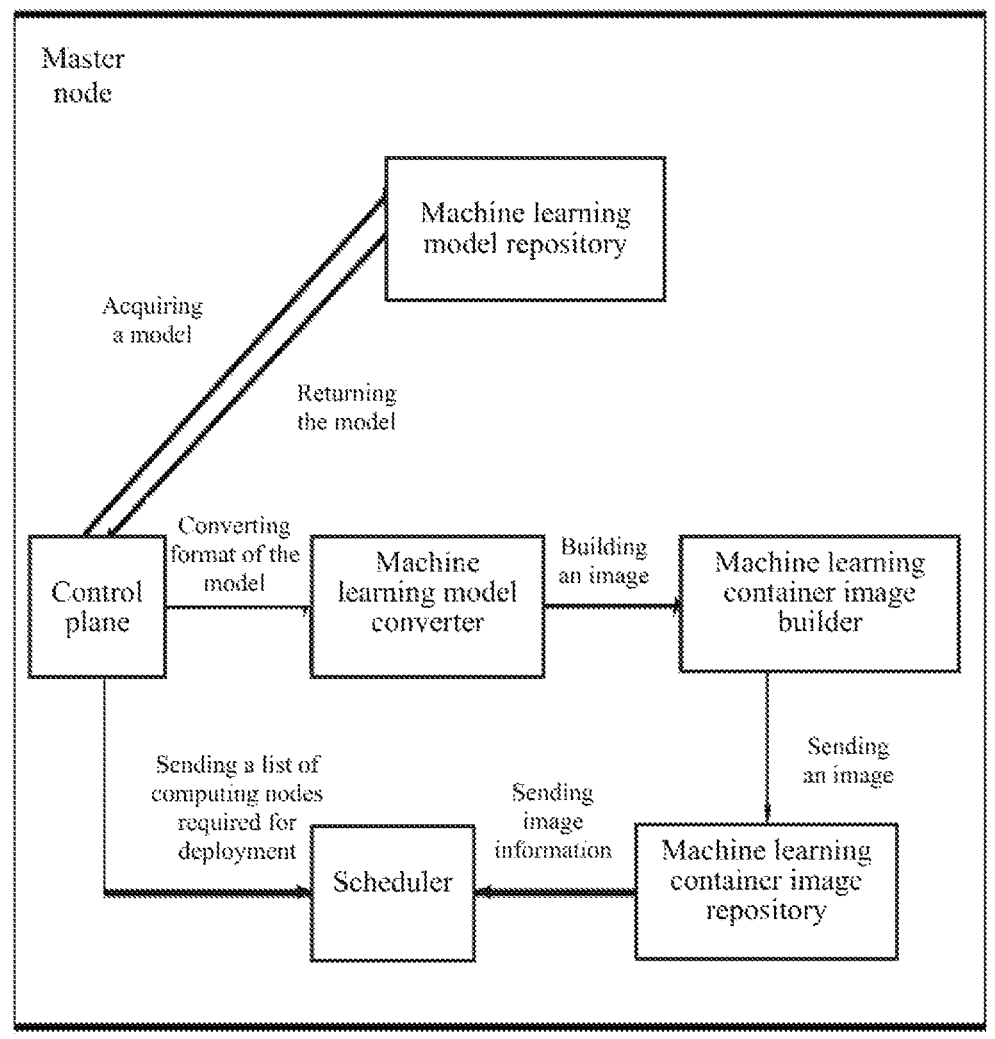
FIG. 2 is a composition diagram of a master node in FIG. 1.
Figure 3:
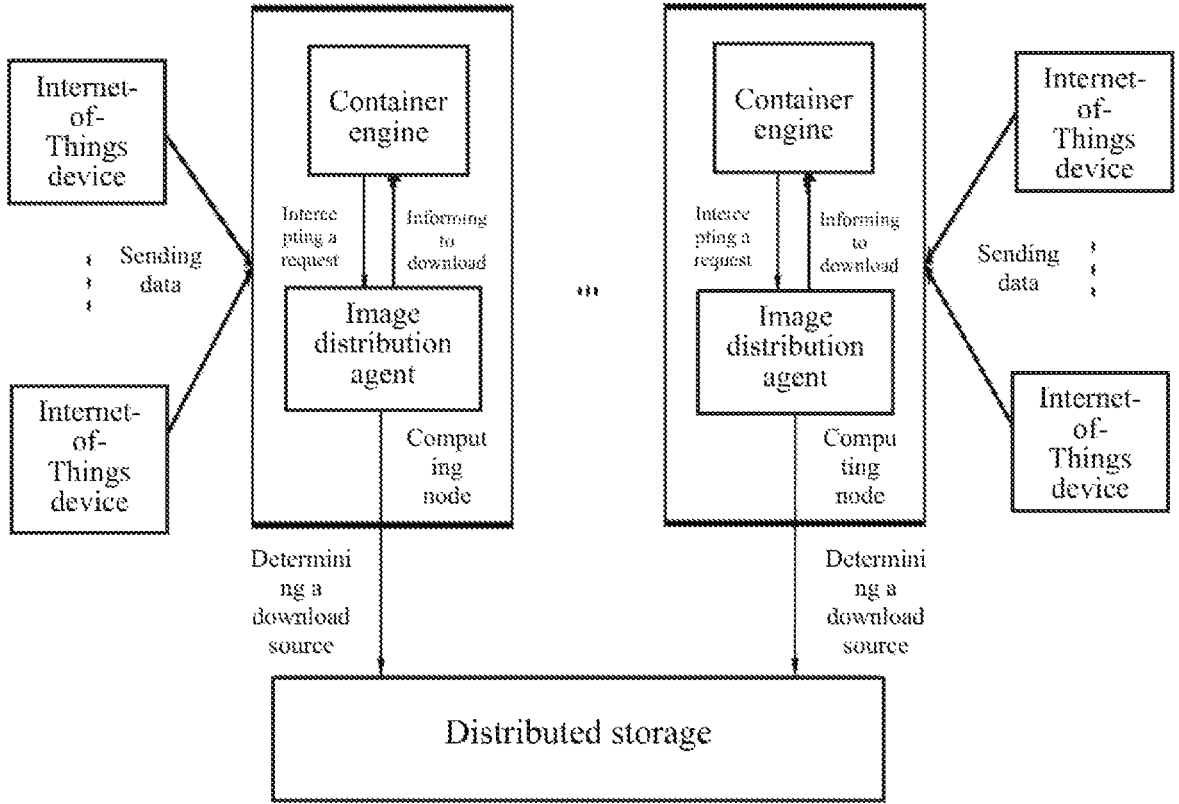
FIG. 3 is a composition diagram of computing nodes in FIG. 1.
Figure 4:
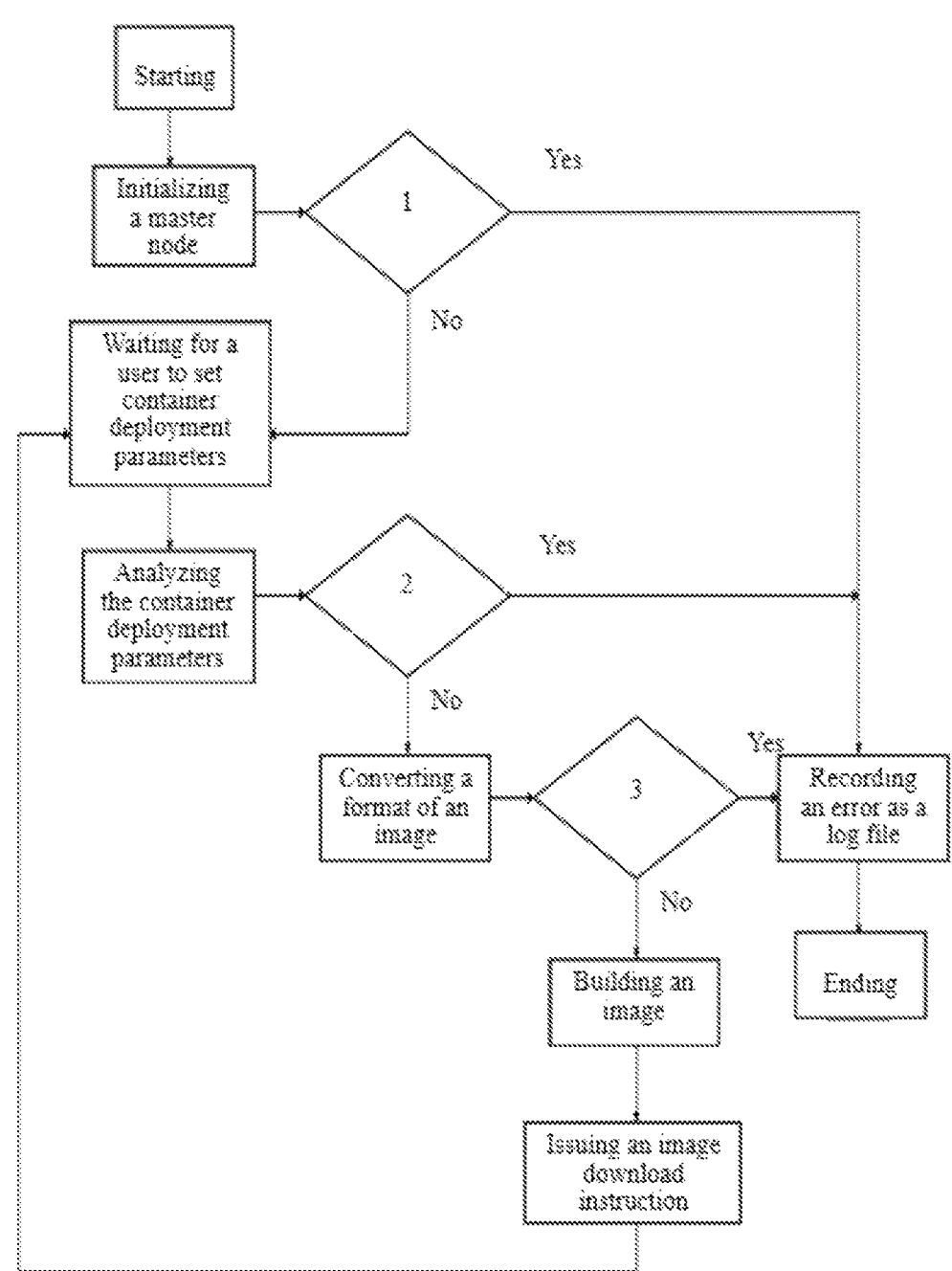
FIG. 4 is a working process diagram of the master node in FIG. 1.
Figure 5:
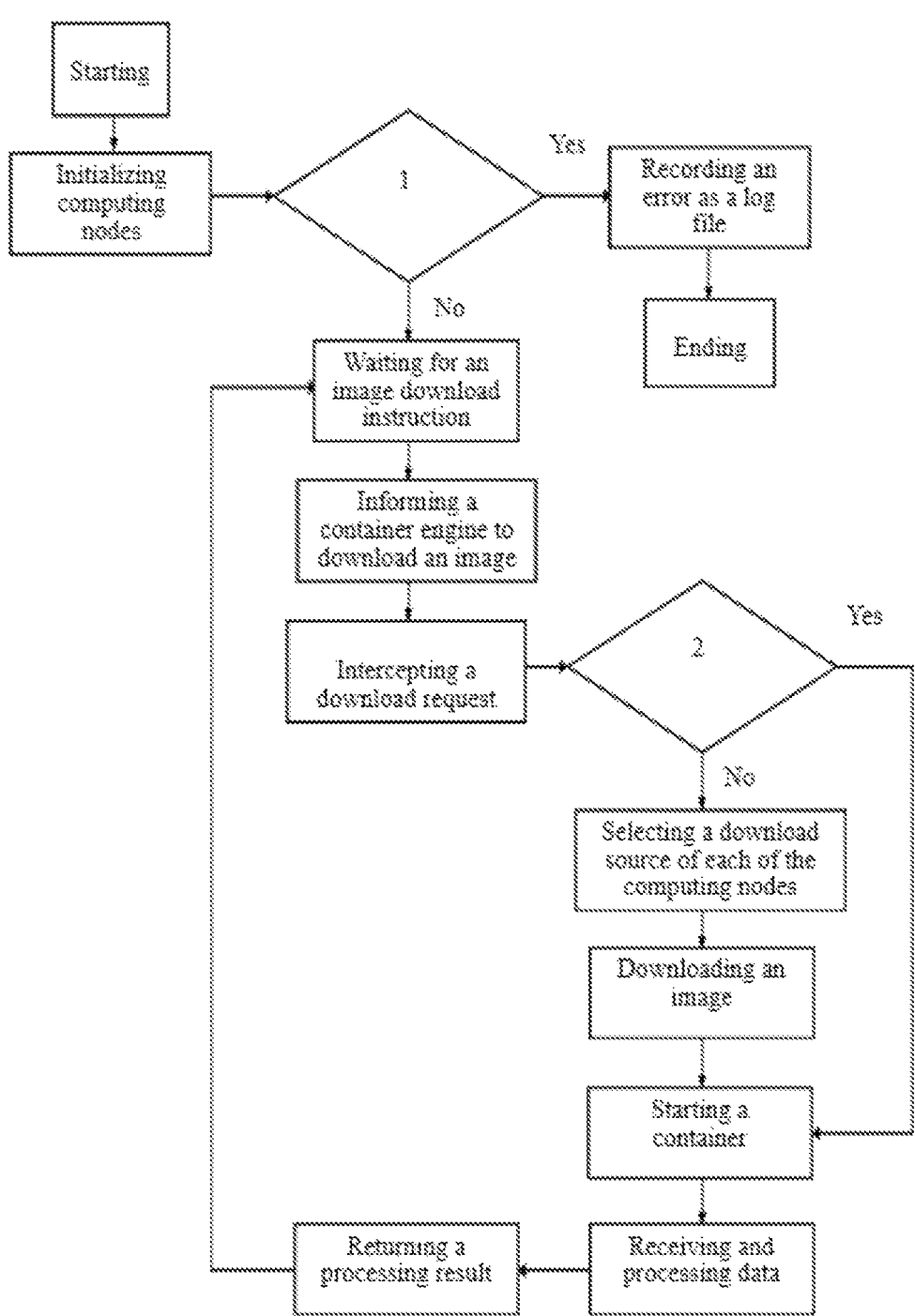
FIG. 5 is a working process diagram of the computing nodes in FIG. 1.
Figure 6:
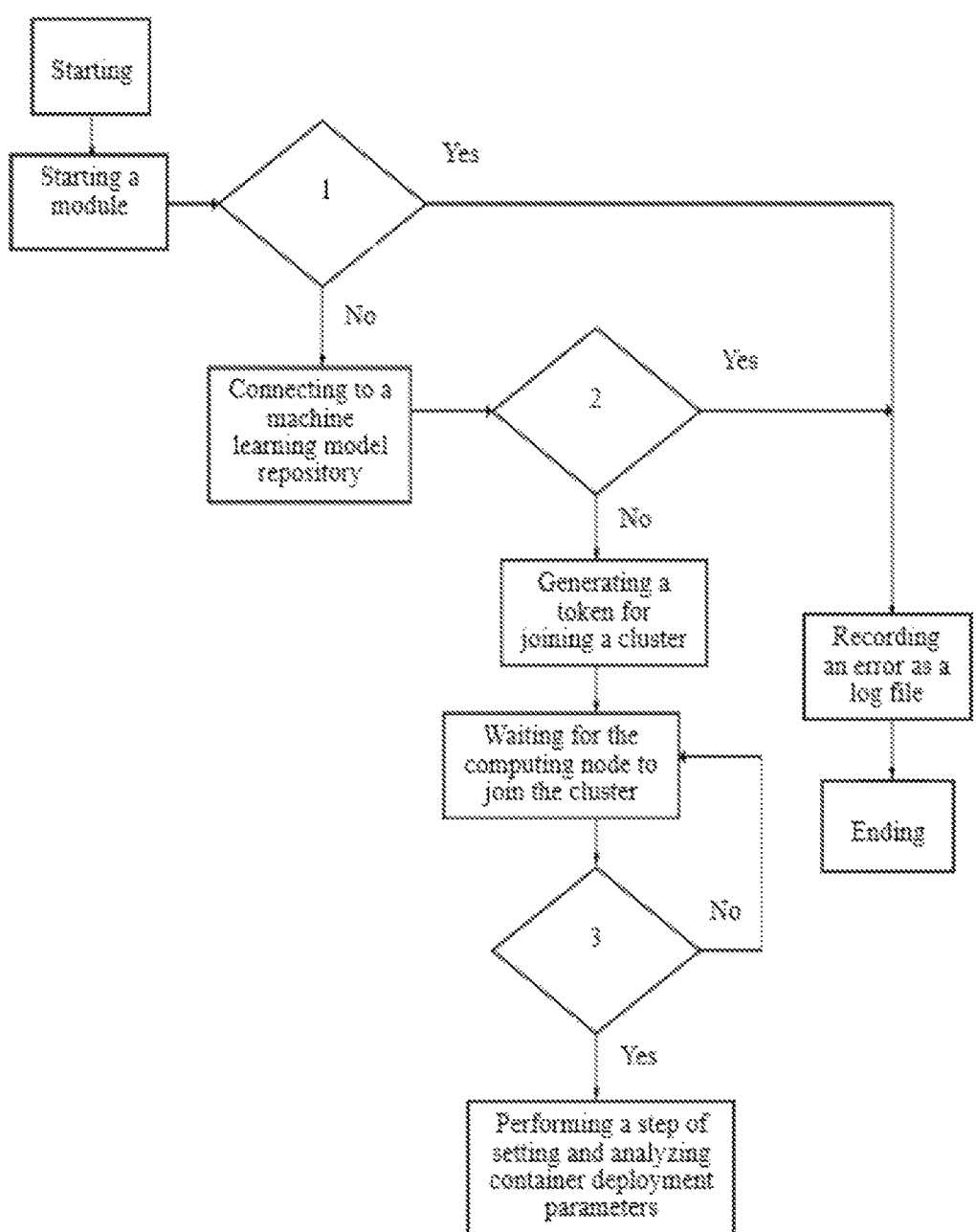
FIG. 6 is an initialization process diagram of the master node in FIG. 1.
Figure 7:
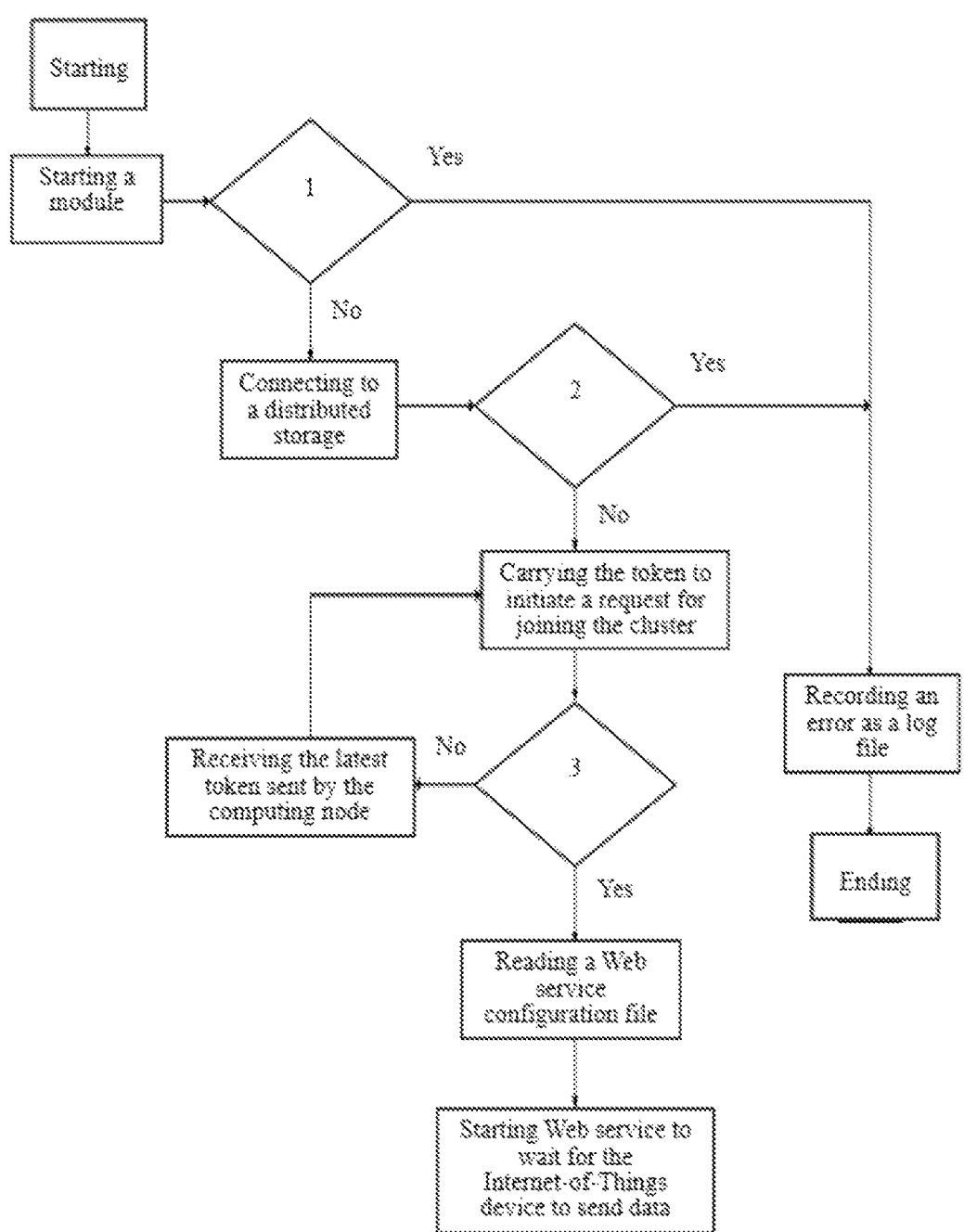
FIG. 7 is an initialization process diagram of the computing nodes in FIG. 1.
Figure 8:
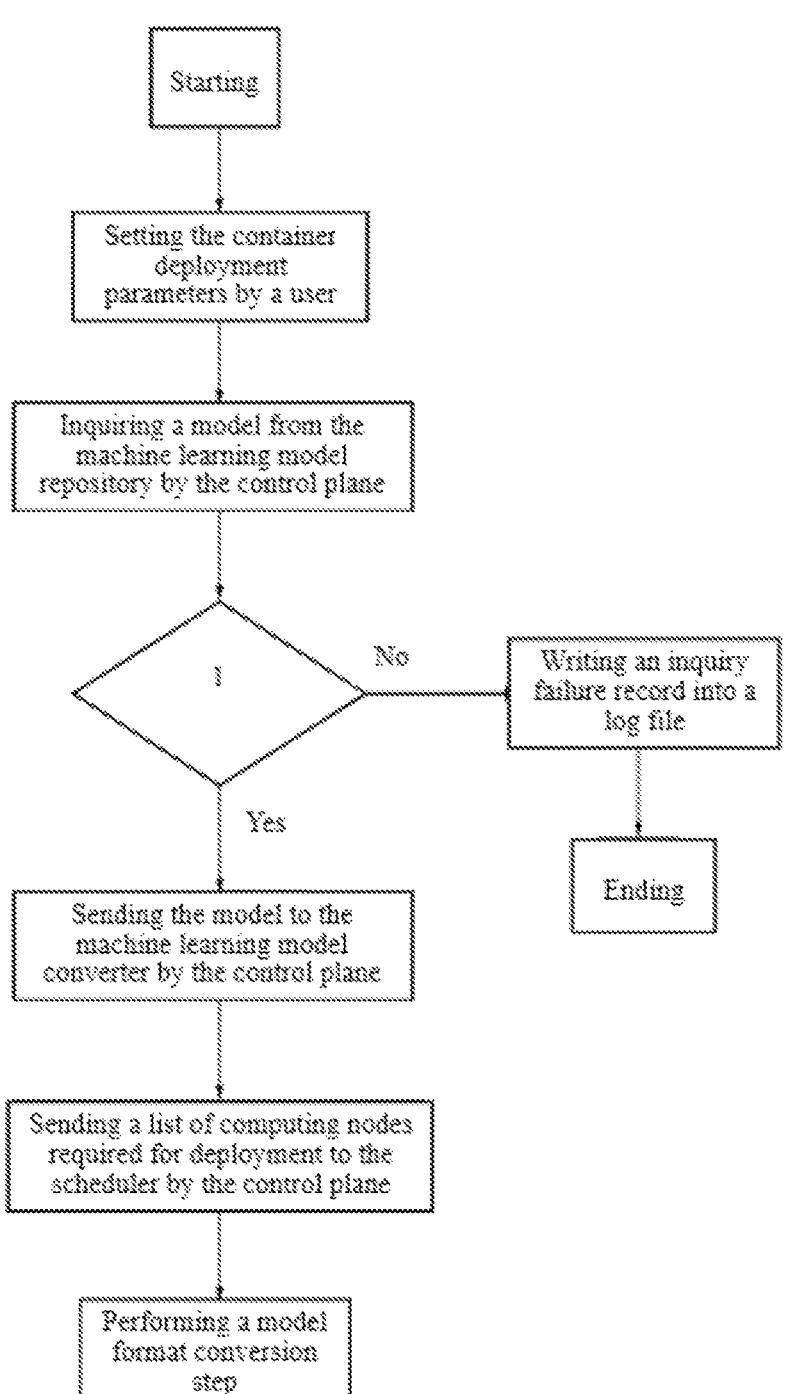
FIG. 8 is a diagram showing setting and analyzing processes for container deployment parameters in a method for an Internet-of-Things-oriented machine learning container image download system provided by the present disclosure.
Figure 9:
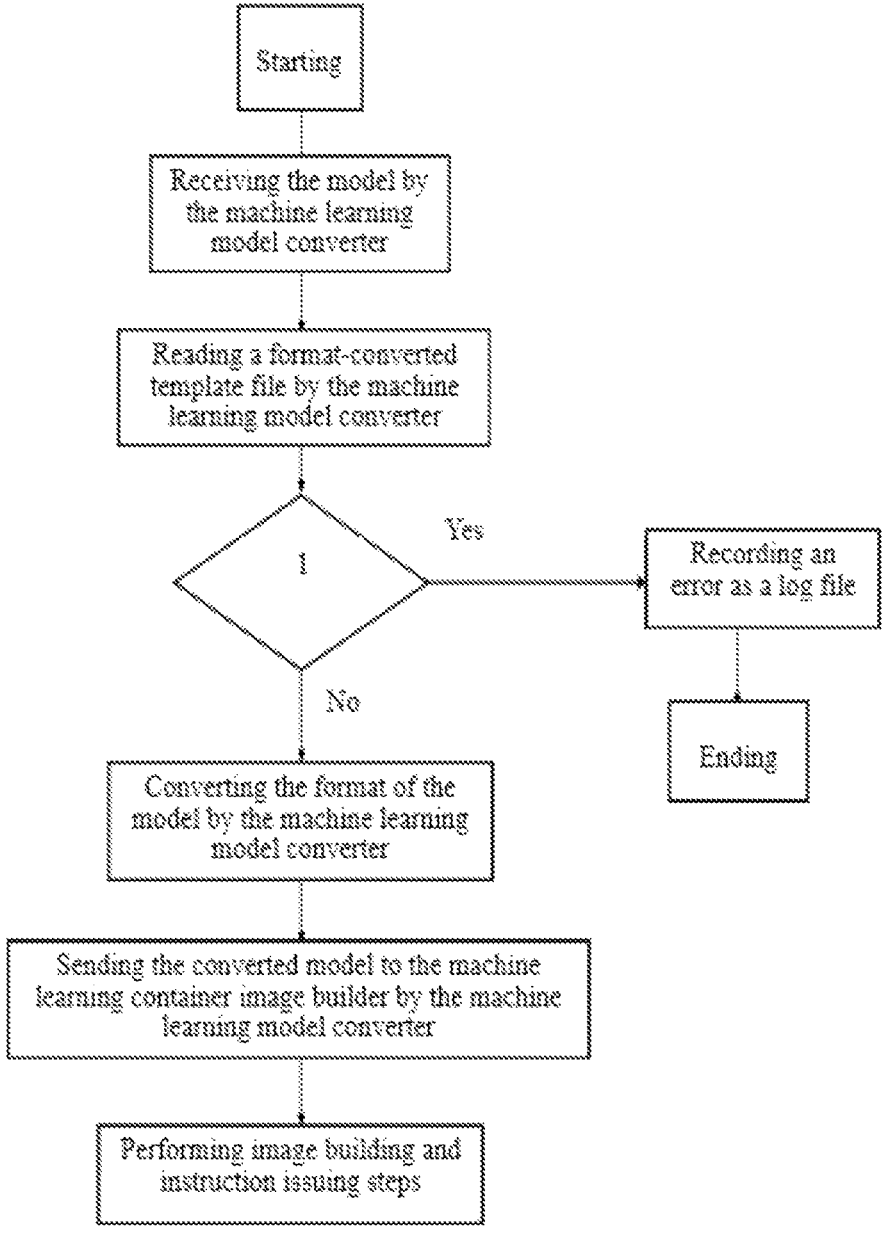
FIG. 9 is a diagram showing a model format conversion process of the method for the Internet-of-Things-oriented machine learning container image download system provided by the present disclosure.
Figure 10:
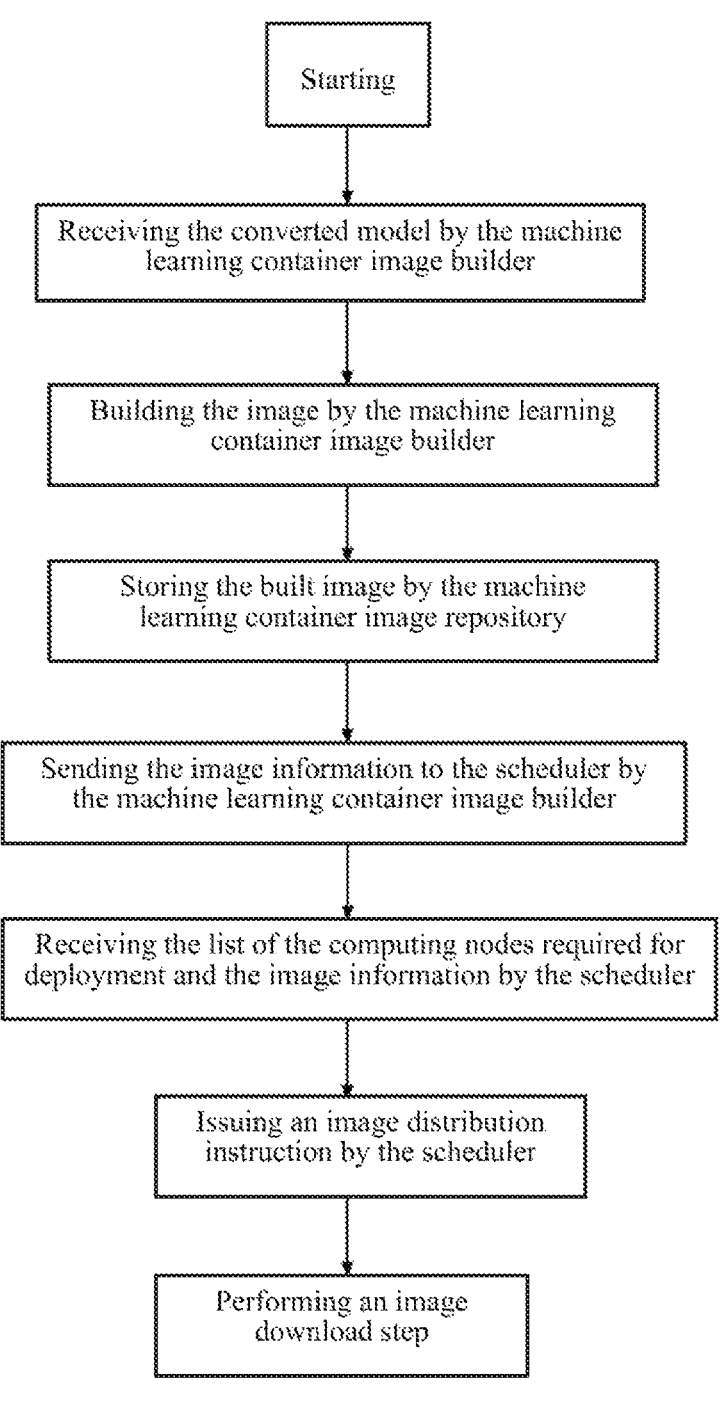
FIG. 10 is a diagram showing an image building and instruction issuing process of the method for the Internet-of-Things-oriented machine learning container image download system provided by the present disclosure.
Figure 11:
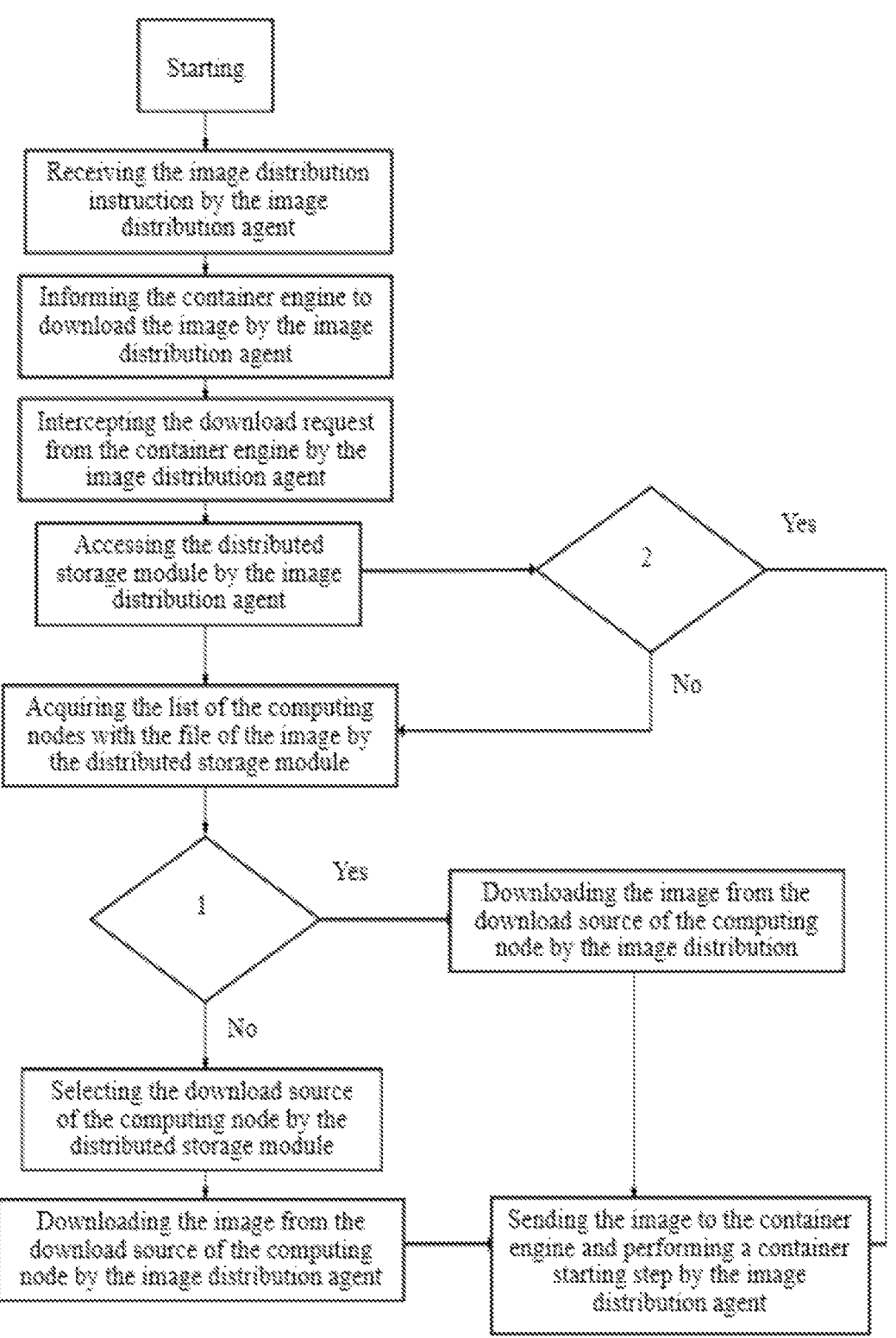
FIG. 11 is a diagram showing an image download process of the method for the Internet-of-Things-oriented machine learning container image download system provided by the present disclosure.

With reference to FIG. 1, FIG. 2 and FIG. 3, the present embodiment provides an Internet-of-Things-oriented machine learning container image download system, including a master node and a plurality of computing nodes; the master node being configured to store an acquired machine learning model and convert the stored machine learning model, and build a machine learning container image from the format-converted machine learning model; and issue an image download instruction to each of the computing nodes after image information of the machine learning container image is completely built. The machine learning model includes a pre-training machine learning model in the field of computer vision and natural language processing.

Each of the computing nodes is configured to receive the image download instruction issued by the master node, and download the machine learning container image; and start a machine learning container. The computing node receives data sent and collected by Internet-of-Things devices, processes this data, and returns a data processing result to the Internet-of-Things devices.

The master node includes a control plane, a machine learning model repository, a machine learning model converter, a machine learning container image builder, a machine learning container image repository and a scheduler. The control plane is configured to read and analyze machine learning container deployment parameters set by a user, wherein the machine learning container deployment parameters includes a type of the machine learning model, a machine learning computing framework on which the machine learning model depends, and a corresponding computing node parameter required for deploying the machine learning container.

The machine learning model repository takes charge of storing machine learning models depending on different machine learning computing frameworks, these machine learning models are mainstream machine learning models with each including a dimensional requirement for machine learning model input, a dimensional requirement for machine learning model output, a machine learning model structure and a machine learning model weight information obtained in a training process.

The machine learning model converter is configured to convert a corresponding machine learning computing framework provided by the machine learning model into a template file in an ONNX format and convert the machine learning model depending on this machine learning computing framework into a machine learning model in the ONNX format.

The machine learning container image builder takes charge of building the machine learning container image based on the machine learning model completely converted into the ONNX format and can send the completely built image information of the machine learning container image to the machine learning container image repository. The machine learning container image further includes running scripts for executing the machine learning model and its dependent libraries in addition to the machine learning model in the ONNX format.

The machine learning container image repository takes charge of receiving and storing the machine learning container image with the image information and sending the image information of the machine learning container image to the scheduler.

The scheduler takes charge of receiving the computing node parameter set from the control plane and receiving the image information of the machine learning container image sent from the machine learning container image repository.

In the present embodiment, each of the computing nodes includes an image distribution agent, a container engine and a distributed storage module (a download source).

The image distribution agent is configured to receive the image download instruction issued by the scheduler in the master node, inform the container engine to download the required machine learning container image, intercept a download request of the required machine learning container image from the container engine, and access the distributed storage module in the local computing node. The distributed storage module downloads the machine learning container image from the download source of the machine learning container image by adopting a Bitswap protocol, so that the competition for outlet bandwidth resources of a centralized container image repository can be effectively mitigated.

The container engine is configured to receive a machine learning container image download notification sent by the image distribution agent and initiate the download request of the machine learning container image.

All the distributed storage modules in all the computing nodes are interconnected with one another, so that the download source including the machine learning container image can be acquired for the image distribution agent, and the entire file of the machine learning container image can be downloaded from this download source (the distributed storage module); and each distributed storage module has a function of storing the downloaded machine learning container image.

Embodiment 2

With reference to FIG. 4 to FIG. 11 in conjunction with embodiment 1, the present embodiment provides an Internet-of-Things-oriented machine learning container image download method. This method includes the following steps:

the control plane, the machine learning model repository, the machine learning model converter, the machine learning container image builder, the machine learning container image repository and the scheduler of the master node are started; in a case that all the modules of the master node are successfully started, if connection fails, the master node writes the connection failure reason and the timestamp into a local log file to facilitate error check performed by operating and maintaining personnel; and if connection succeeds, the master node builds an edge cluster and generates a token for joining the cluster to wait for the computing nodes to join the cluster (the edge cluster consists of the master node and the computing nodes).

After all the above-mentioned modules are successfully started to wait for a user to set the container deployment parameters, the control plane reads and analyzes the machine learning container deployment parameters set by the user; the name of the machine learning model is analyzed, and the required machine learning model is found from the machine learning model repository; and the machine learning model stored in the machine learning model repository is called and transmitted to the machine learning model converter.

The machine learning model converter performs format conversion on the called machine learning model; after the machine learning model depending on the given machine learning computing framework is converted into a machine learning model in the ONNX format, the converted machine learning model is sent to the machine learning container image builder;

the machine learning container image builder receives the machine learning model in the ONNX format and builds the machine learning container image from the machine learning model in the ONNX format; and the completed machine learning container image is stored in the machine learning container image repository;

the machine learning container image repository sends the completely built image information of the machine learning container image to the scheduler; and the scheduler issues the image download instruction to the computing nodes which require the machine learning container set by the user, and the image distribution agent, the container engine and the distributed storage module of each of the computing nodes are started; if a module of the computing node fails to start, the computing node writes a name of the module failing to start, the starting failure reason and the timestamp into a local log file to facilitate error check performed by operating and maintaining personnel. If all the above-mentioned modules are successfully started, the computing node will try to be connected to the distributed storage module. If the connection is successful, the computing node carries information of the token for joining the cluster to initiate a request of joining the edge cluster to the master node. If the request is passed, the computing node sends a request for acquiring information of the latest token to the master node. If the request is passed, the computing node checks a content in a local Web service configuration file. The Web service configuration file includes an IP address and a port number of this computing node. The computing node starts a Web server and blocks monitoring according to the IP address and the port number in the configuration file, and waits for the Internet-of-Things devices to report acquired data.

The image distribution agent in the computing node waits for and receives the image download instruction, informs the container engine to initiate the download request of the machine learning container image to the machine learning container image repository; the machine learning container image is acquired from the distributed storage module; and the machine learning container image is sent to the container engine; and the container engine downloads the entire file of the required machine learning container image; the corresponding machine learning container is started; the computing node receives data collected by the Internet-of-Things devices, and data processing is performed by this started machine learning container; and the data processing result of the machine learning model is returned to the Internet-of-Things devices by the image distribution agent.

Optionally, the step that the machine learning model converter performs format conversion on the called machine learning model includes:

the machine learning model converter receives the machine learning model depending on the given machine learning computing framework sent by the control plane, and reads the template file converted into the ONNX format from the machine learning computing formwork, if the file fails to read, the machine learning model converter writes the reading failure reason and the timestamp into a local log file to facilitate error check performed by operating and maintaining personnel. If the file is successfully read, the machine learning model converter converts the machine learning model and its dependent machine learning computing framework into the ONNX format; and the machine learning model converter sends the machine learning model completely converted into the ONNX format to the machine learning container image builder.

Optionally, the step that the container engine acquires the file of the machine learning container image includes:

the image distribution agent informs the container engine to initiate the download request of the machine learning container image to the machine learning container image repository; and the image distribution agent intercepts the download request of the machine learning container image from the container engine, accesses the distributed storage module, and examines whether the file of the machine learning container image exists locally.

If the file of the machine learning container image exists in the local distributed storage module, the image distribution agent acquires the file of the machine learning container image from the local distributed storage module and sends the file to the container engine; if the file of the machine learning container image does not exist in the local distributed storage module, the distributed storage module inquires whether the file of the required machine learning container image is included in the distributed storage modules of other computing nodes.

If the inquired distributed storage modules of other computing nodes are null, the image distribution agent initiates the download request of the machine learning container image to the machine learning container image repository of the master node, and sends the downloaded file of the machine learning container image to the container engine.

If the inquired distributed storage modules of other computing nodes are not null, the local distributed storage module selects the computing node of which the distributed storage module has the highest transmission rate as the download source of this machine learning container image, and sends the machine learning container image to the container engine.

A user sets the machine learning container deployment parameters on the control plane of the master node. The step that the machine learning container deployment parameters are analyzed is that the control plane of the master node analyzes the machine learning container deployment parameters set by the user. This step may include the following steps:

the user sets the machine learning container deployment parameters on the control plane of the master node, wherein the machine learning container deployment parameters includes a type of the machine learning model, a machine learning computing framework on which the machine learning model depends, and a computing node parameter required for deploying this machine learning container.

The control plane carries the type of the machine learning model set by the user and the machine learning computing framework on which the machine learning model depends to send an inquiry request to the machine learning model repository. If no records are inquired in the machine learning model repository, the control plane writes the machine learning model inquiry failure record and the timestamp into a local log file to facilitate error check performed by operating and maintaining personnel. Or else, the control plane acquires the inquired machine learning model depending on the given machine learning computing framework from the machine learning model repository and sends this model to the machine learning model converter. The control plane sends the computing nodes which require for deploying this machine learning model set by the user to the scheduler.

The step that the format of the machine learning model is converted is that the machine learning model converter of the master node converts the machine learning model sent by the control plane and depending on the given machine learning computing framework into the ONNX format. This step may include the following steps:

the machine learning model converter receives the machine learning model sent by the control plane and depending on the given machine learning computing framework and reads the template file converted into the ONNX format from the machine learning computing framework, if the file fails to read, the machine learning model converter writes the reading failure reason and the timestamp into a local log file to facilitate error check performed by operating and maintaining personnel.

If the file is successfully read, the machine learning model converter converts the machine learning model and its dependent machine learning computing framework into the ONNX format. The machine learning model converter sends the machine learning model completely converted into the ONNX format to the machine learning container image builder.

The machine learning model converter builds the machine learning container image based on the machine learning model in the ONNX format. An instruction issuing step is that the scheduler issues an image distribution instruction to each of the computing nodes. This step may include the following steps: the machine learning container image builder receives the machine learning model in the ONNX format sent by the machine learning model converter.

The machine learning container image builder builds the machine learning container image based on the machine learning model completely converted into the ONNX format and stores this image information into the machine learning container image repository. The machine learning container image includes the machine learning model in the ONNX format, running scripts for executing the machine learning model and its dependent libraries.

The machine learning container image builder sends the completely built image information to the scheduler, and the scheduler receives the computing node parameter set on the control plane by the user and required for deploying this machine learning container and the image information sent by the machine learning container image builder. The scheduler issues the image distribution instruction to the computing nodes which require for deploying this machine learning container set on the control plane by the user. The image distribution instruction includes the image information sent by the machine learning container image builder.

The container is operated according to the file of the machine learning container image downloaded by the container engine. This step may include the following steps: the container engine checks whether the entire file of the required machine learning container image is downloaded completely, if it is not downloaded completely, the container engine further waits for the download of the file of the machine learning container image.

If the entire file of the required machine learning container image is downloaded completely, the container engine decompresses the downloaded file of the machine learning container image and starts the machine learning container. Each of the computing nodes receives data collected by the Internet-of-Things devices, and data processing is performed by the machine learning container. The image distribution agent in each of the computing nodes returns the data processing result of the machine learning container to the Internet-of-Things devices.

It should be understood by the skilled in the art that the embodiments of the present application may provide a method, system or computer program product. Therefore, forms of a complete hardware embodiment, a complete software embodiment or a software and hardware aspect combined embodiment may be adopted in the present application. Moreover, a form of a computer program product executed on one or more computer available storage media (including, but not limited to a magnetic disk memory, a CD-ROM and an optical memory) including computer available program codes may be adopted in the present application.

The present application is described by referring to process diagrams and/or block diagrams of the method, device (system) and computer program product according to the embodiments of the present application. It should be understood that each process and/or block in the process diagrams and/or block diagrams as well as a combination of processes and/or blocks in the process diagrams and/or block diagrams may be realized by computer program instructions. The computer program instructions may be provided to a general-purpose computer, a special-purpose computer, an embedded processor or processors of other programmable data processing devices to generate a machine, so that an apparatus for realizing specified functions in one or more processes in the process programs and/or one or more blocks in the block diagrams is generated by the instructions executed by the computer or the processors of other programmable data processing devices.

These computer program instructions may also be stored in a computer readable memory capable of guiding the computer or other programmable data processing devices to work in a specific way, so that the instructions stored in this computer readable memory generate a product including an instruction apparatus, and this instruction apparatus realizes the functions specified in the one or more processes in the process diagrams and/or one or more blocks in the block diagrams.

These computer program instructions may also be loaded in the computer or other programmable data processing devices, so that a series of operation steps are performed on the computer or other programmable data processing devices to generate processing realized by the computer, and furthermore, the instructions executed on the computer or other programmable data processing devices provide steps for realizing the specified functions in the one or more processes in the process diagrams and/or one or more blocks in the block diagrams.

What is claimed is:

1. An Internet-of-Things-oriented machine learning container image download system, comprising a master node and a plurality of computing nodes;

wherein the master node is configured to store and convert a machine learning model, and build a machine learning container image from a format-converted machine learning model; and issue an image download instruction to each of the computing nodes after image information of the machine learning container image is completely built; and each of the computing nodes is configured to receive the image download instruction, download the machine learning container image, and start a machine learning container; and receive data collected by Internet-of-Things devices, and return a data processing result to the Internet-of-Things devices;

wherein the master node comprises a control plane, a machine learning model repository, a machine learning model converter, a machine learning container image builder, a machine learning container image repository and a scheduler;

the control plane is configured to read and analyze machine learning container deployment parameters set by a user, wherein the machine learning container deployment parameters comprise a type of the machine learning model, a corresponding machine learning computing framework on which the machine learning model depends, and a computing node parameter required for deploying the machine learning container;

the machine learning model repository is configured to store the machine learning model;

the machine learning model converter is configured to convert the machine learning model into a machine learning model in an Open Neural Network Exchange (ONNX) format;

the machine learning container image builder is configured to build the machine learning container image according to the machine learning model converted into the ONNX format;

the machine learning container image repository is configured to store the machine learning container image with image information; and the scheduler is configured to receive the computing node parameter set on the control plane and the image information of the machine learning container image, and send the image download instruction to each of the computing nodes.

2. The Internet-of-Things-oriented machine learning container image download system of claim 1, wherein the machine learning model comprises a pre-training machine learning model in the field of computer vision and natural language processing.

3. The Internet-of-Things-oriented machine learning container image download system of claim 1, wherein each of the computing nodes comprises an image distribution agent, a container engine and a distributed storage module;

the image distribution agent is configured to receive the image download instruction, inform the container engine to download the machine learning container image, intercept a download request for the machine learning container image from the container engine, and access the distributed storage module in the computing node where the image distribution agent is located;

the container engine is configured to receive a notification from the image distribution agent and initiate the download request of the machine learning container image; and the distributed storage module is configured to store the downloaded machine learning container image, acquire a download source comprising the machine learning container image for the image distribution agent, and download the machine learning container image from the acquired download source, wherein all the distributed storage modules are interconnected with one another.

4. The Internet-of-Things-oriented machine learning container image download system of claim 3, wherein the distributed storage module downloads the machine learning container image from the download source of the machine learning container image by adopting a Bitswap protocol.

5. The Internet-of-Things-oriented machine learning container image download system of claim 1, wherein the completely built machine learning container image comprises running scripts for executing the machine learning model and its dependent libraries.

6. An Internet-of-Things-oriented machine learning container image download method, applied to the Internet-of-Things-oriented machine learning container image download system of claim 3, wherein the method comprises the following steps:

reading the machine learning container deployment parameters set by the user, analyzing a name of the machine learning model, and finding the required machine learning model from the machine learning model repository by a control plane; receiving a converted machine learning model in the Open Neural Network Exchange (ONNX) format, and building the machine learning container image by the machine learning container image builder; and sending a stored information of the machine learning container image to the scheduler by the machine learning container image repository; and after the image distribution agent receives the image download instruction, acquiring an entire file of the machine learning container image from the download source of the machine learning container image by a corresponding distributed storage module; starting a corresponding machine learning container; receiving, by each of computing nodes, data collected by Internet-of-Things devices, and performing data processing by a started machine learning container; and feeding a data processing result from the machine learning container back to the Internet-of-Things devices by the image distribution agent.

7. The method for the Internet-of-Things-oriented machine learning container image download system of claim 6, wherein a step that the machine learning model converter performs format conversion on a called machine learning model comprises:

receiving the machine learning model that is sent by the control plane and dependent on a machine learning computing framework given by the machine learning model converter; and reading a template file converted into the ONNX format from the machine learning computing formwork;

if the file fails to read, writing a reading failure reason and a timestamp into a local log file by the machine learning model converter to facilitate error check performed by operating and maintaining personnel; and if the file is successfully read, converting the machine learning model and its dependent machine learning computing framework into the ONNX format by the machine learning model converter.

8. The method for the Internet-of-Things-oriented machine learning container image download system of claim 6, wherein a step that the container engine acquires the file of the machine learning container image comprises:

informing, by the image distribution agent, the container to initiate the download request of the machine learning container image to the machine learning container image repository; meanwhile, intercepting, by the image distribution agent, the download request initiated by the container engine, accessing the distributed storage module, and examining whether the file of the machine learning container image exists locally;

if the file exists, acquiring the file of the machine learning container image from the distributed storage module, and sending the file to the container engine by the image distribution agent;

if the file does not exist, inquiring, by the distributed storage module, whether the file of the required machine learning container image is comprised in the distributed storage modules of other computing nodes;

if the file is not found in a list of other computing nodes, initiating the download request for the machine learning container image to the machine learning container image repository of the master node, and sending the downloaded file of the machine learning container image to the container engine by the image distribution agent; and if the file is found in the distributed storage modules of other computing nodes, selecting the computing node of which the distributed storage module has the highest transmission rate as the download source of the machine learning container image; and sending the machine learning container image to the container engine.

* * * * *